US011958059B2

(12) United States Patent
Park et al.

(10) Patent No.: US 11,958,059 B2
(45) Date of Patent: Apr. 16, 2024

(54) ELECTROSTATIC DUST FILTER

(71) Applicant: LG ELECTRONICS INC., Seoul (KR)

(72) Inventors: Minjae Park, Seoul (KR); Chulwoo Park, Seoul (KR); Ilna Son, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 241 days.

(21) Appl. No.: 17/399,362

(22) Filed: Aug. 11, 2021

(65) Prior Publication Data

US 2022/0048045 A1 Feb. 17, 2022

(30) Foreign Application Priority Data

Aug. 14, 2020 (KR) ........................ 10-2020-0102543

(51) Int. Cl.
*B03C 3/155* (2006.01)
*B03C 3/08* (2006.01)
*B03C 3/12* (2006.01)
*B03C 3/41* (2006.01)

(52) U.S. Cl.
CPC ................ *B03C 3/155* (2013.01); *B03C 3/08* (2013.01); *B03C 3/12* (2013.01); *B03C 3/41* (2013.01); *B03C 2201/14* (2013.01)

(58) Field of Classification Search
USPC ........................................................... 95/139
See application file for complete search history.

(56) References Cited

U.S. PATENT DOCUMENTS 3,073,094 A * 1/1963 Landgraf ................ B03C 3/155 96/66
4,115,082 A * 9/1978 Newell ..................... B03C 3/28 55/501
5,403,383 A * 4/1995 Jaisinghani ............. B03C 3/155 95/79
5,435,817 A * 7/1995 Davis ................. B01D 46/0095 96/204
5,540,761 A * 7/1996 Yamamoto .............. B03C 3/155 96/99

(Continued)

FOREIGN PATENT DOCUMENTS

EP 1258281 A2 * 11/2002 ............. B01D 53/32
JP H06210115 A * 8/1994

(Continued)

*Primary Examiner* — Christopher P Jones
*Assistant Examiner* — Sonji Turner
(74) *Attorney, Agent, or Firm* — KED & ASSOCIATES, LLP

(57) ABSTRACT

Provided is an electrostatic dust filter including a frame that is opened back and forth and forms a space through which air passes, a chemical absorbent that is accommodated in the space and absorbs harmful substance in the air, a mesh member that covers the front of the frame and has a plurality of pores through which the air passes, a ground electrode that covers the rear of the frame and has the plurality of pores through which the air passes, and is grounded, and a voltage electrode that is disposed to opposite to the ground electrode with respect to the mesh member and applied with a high voltage.

8 Claims, 11 Drawing Sheets

F'
O'
A
A
43'
20'
21'
11'
10'
15'
45'
A
A
I
41'
23'

(56) References Cited

U.S. PATENT DOCUMENTS

| | | | | | |
|---|---|---|---|---|---|
| 5,647,890 | A * | 7/1997 | Yamamoto | B03C 3/155 | 96/57 |
| 6,036,757 | A * | 3/2000 | Gatchell | B01D 46/46 | 95/25 |
| 7,452,410 | B2 * | 11/2008 | Bergeron | B03C 3/70 | 96/99 |
| 8,323,385 | B2 * | 12/2012 | Nutsos | B03C 3/49 | 55/528 |
| 9,216,233 | B2 * | 12/2015 | Ota | B03C 3/017 | |
| 2005/0092176 | A1 * | 5/2005 | Ding | B01J 20/20 | 96/108 |
| 2008/0170971 | A1 * | 7/2008 | Bergeron | A61L 9/22 | 422/186.04 |
| 2011/0274588 | A1 * | 11/2011 | Bergeron | B03C 3/41 | 422/121 |
| 2013/0071298 | A1 * | 3/2013 | Tanimura | B03C 3/02 | 422/187 |

FOREIGN PATENT DOCUMENTS

| | | | | |
|---|---|---|---|---|
| JP | H06254433 A | * | 9/1994 | |
| KR | 20030075702 A | * | 9/2003 | |
| KR | 10-2004-0013047 | | 2/2004 | |
| KR | 20040038210 A | * | 5/2004 | |
| KR | 10-1231574 | | 2/2013 | |
| KR | 20170032698 A | * | 3/2017 | |
| WO | WO-2006016346 A1 | * | 2/2006 | B03C 3/017 |

* cited by examiner

ELECTROSTATIC DUST FILTER

BACKGROUND OF THE DISCLOSURE

Field of the Disclosure

The present disclosure relates to an electrostatic dust filter, and more particularly, to an electrostatic dust filter capable of purifying air by collecting dust contained in the air through electrostatic force and promoting a chemical reaction of a chemical absorbent that absorbs harmful substances including carbon dioxide and harmful gas.

Related Art

In general, a dust collecting filter is a device that is installed in an air conditioner such as an air cleaner, an air conditioner, or a heater to collect dust or the like that is contained in the air. Among them, an electrostatic dust filter polarizes dust contained in the air through electrostatic force formed between electrodes, thereby increasing the performance of collecting the dust on the electrodes or a filter medium.

Korean Patent No. 10-1231574, which is related to an electrostatic dust filter, discloses a dust collecting filter that has porous electrodes provided on both sides of a dielectric filter medium, and is electrostatically activated by applying a voltage of a certain magnitude between the porous electrodes to electrically polarize foreign lipids in the air and the dielectric filter medium.

Meanwhile, carbon dioxide (carbon dioxide: CO2) is generated due to complete combustion of carbon or its compounds and by respiration, fermentation, or the like of living things, and accounts for about 0.035% in the atmosphere. A concentration of carbon dioxide may increase due to the continuous respiration of organisms in an enclosed space. When the concentration of carbon dioxide increases, air quality becomes poor. In severe cases, the poor air quality can have adverse effects on the human body, such as a headache, poor concentration, and rapid heart rate which can cause mild vomiting.

In addition, harmful substances such as ammonia, acetaldehyde, acetic acid, toluene, and formaldehyde, which are the five major harmful gases, are carcinogens and may cause disorders in a nervous system when coming into contact with a skin or being inhaled by a respiratory tract.

Recently, the demand for removing various harmful substances (hereinafter, referred to as harmful substances) including carbon dioxide and the five major harmful gases has continued. However, an electrostatic dust filter in the related art (Korean Patent No. 10-1231574) has only dust collection performance, and has a limitation in not filtering harmful substances.

Meanwhile, in order to improve the performance of a chemical absorbent that absorbs harmful substances, researches are being conducted to prepare a chemical absorbent by changing its composition ratio or raw material composition. For example, examples of an disclosure related to soda lime, which is a type of dry absorbent that absorbs harmful substances such as carbon dioxide may include the disclosure disclosed in Korean Patent Laid-Open No. 10-2004-0013047 which is the related art.

However, in the case of the conventional chemical absorbent, there are still limitations in the absorption amount and absorption rate of the chemical absorbents that may absorb harmful substances, and a problem that as time passes, the absorption performance of chemical absorbents for the harmful substances decreases.

The present disclosure is designed to overcome the above-mentioned problems and limitations, and to reflect the demand for effectively reducing the concentrations of various harmful substances including carbon dioxide and five major harmful gases as well as dust in the air.

SUMMARY

The present disclosure provides an electrostatic dust filter capable of effectively collecting dust in an electrostatic dust method and improving air purification performance by accelerating absorption of harmful substances by a chemical absorbent.

The problems of the present disclosure are not limited to the above-mentioned problems. That is, other problems that are not mentioned may be obviously understood by those skilled in the art from the following specification.

In an aspect, an electrostatic dust filter includes: a frame that is opened back and forth and forms a space through which air passes; a chemical absorbent that is accommodated in the space and absorbs harmful substance in the air; a mesh member that covers the front of the frame and has a plurality of pores through which the air passes; a ground electrode that covers the rear of the frame and has the plurality of pores through which the air passes, and is grounded; and a voltage electrode that is disposed to opposite to the ground electrode with respect to the mesh member and applied with a high voltage.

The frame may include an outer frame that forms a border of the frame; and an inner frame that partitions the space provided inside the outer frame into a plurality of pieces.

The electrostatic dust filter may further include: a filter casing that forms an inlet communicating with the space, and is recessed in a shape corresponding to the outer frame so that the outer frame is inserted from the rear, in which the voltage electrode may be disposed at the inlet and fixed to the filter casing.

The voltage electrodes may elongated and provided in plurality arranged parallel to each other and disposed parallel to the ground electrodes.

The frame may be formed in a cylindrical shape, and the plurality of spaces may be arranged in a circumferential direction.

The voltage electrode may have a ring shape extending in the circumferential direction along a circumference of the frame, and the voltage electrodes may be provided in plurality arranged parallel to each other, the ground electrode may cover an inner circumferential surface of the frame, and the mesh member may cover an outer circumferential surface of the frame.

The electrostatic dust filter may further include a filter casing that is arranged in a circumferential direction to form a plurality of inlets communicating with the space and fixes the voltage electrode.

The filter casing may include a plurality of casing inner frames extending in an axial direction between the plurality of inlets and arranged in the circumferential direction, and the voltage electrode may be fixed to the plurality of casing inner frames.

The ground electrode and the mesh member may have a mesh shape in which the plurality of pores are formed smaller than a size of the chemical absorbent.

In another aspect, an electrostatic dust filter includes: an inner frame that is opened back and forth and forms a space through which air passes; a chemical absorbent that is accommodated in the space and absorbs harmful substance in the air; a voltage electrode that covers the front of the frame, has a plurality of pores through which the air passes, and is provided with a high voltage; and a ground electrode that covers the rear of the inner frame, has the plurality of pores through which the air passes, and is grounded.

Detailed contents of other embodiments are described in a detailed description and are illustrated in the accompanying drawings.

Advantageous Effects

According to an embodiment of the present disclosure, there are one or more of the following effects.

First, a chemical absorbent is accommodated in a space through which air passes, and plasma is generated in the space, and thus, it is possible to accelerate an absorption reaction of harmful substances by the chemical absorbent and electrically collect dust in the air.

Second, according to the generation of plasma, a chemical reaction rate at which the chemical absorbent absorbs the harmful substances is continuously maintained over time.

The effects of the present disclosure are not limited to the above-mentioned effects. That is, other effects that are not mentioned may be obviously understood by those skilled in the art from the claims.

BRIEF DESCRIPTION OF THE DRAWINGS

FIG. 5A is a diagram illustrating the main configuration of the electrostatic dust filter according to the embodiment of the present disclosure, and FIG. 5B is a diagram illustrating a main configuration of an electrostatic dust filter according to another embodiment of the present disclosure.

DESCRIPTION OF EXEMPLARY EMBODIMENTS

Figure 1:
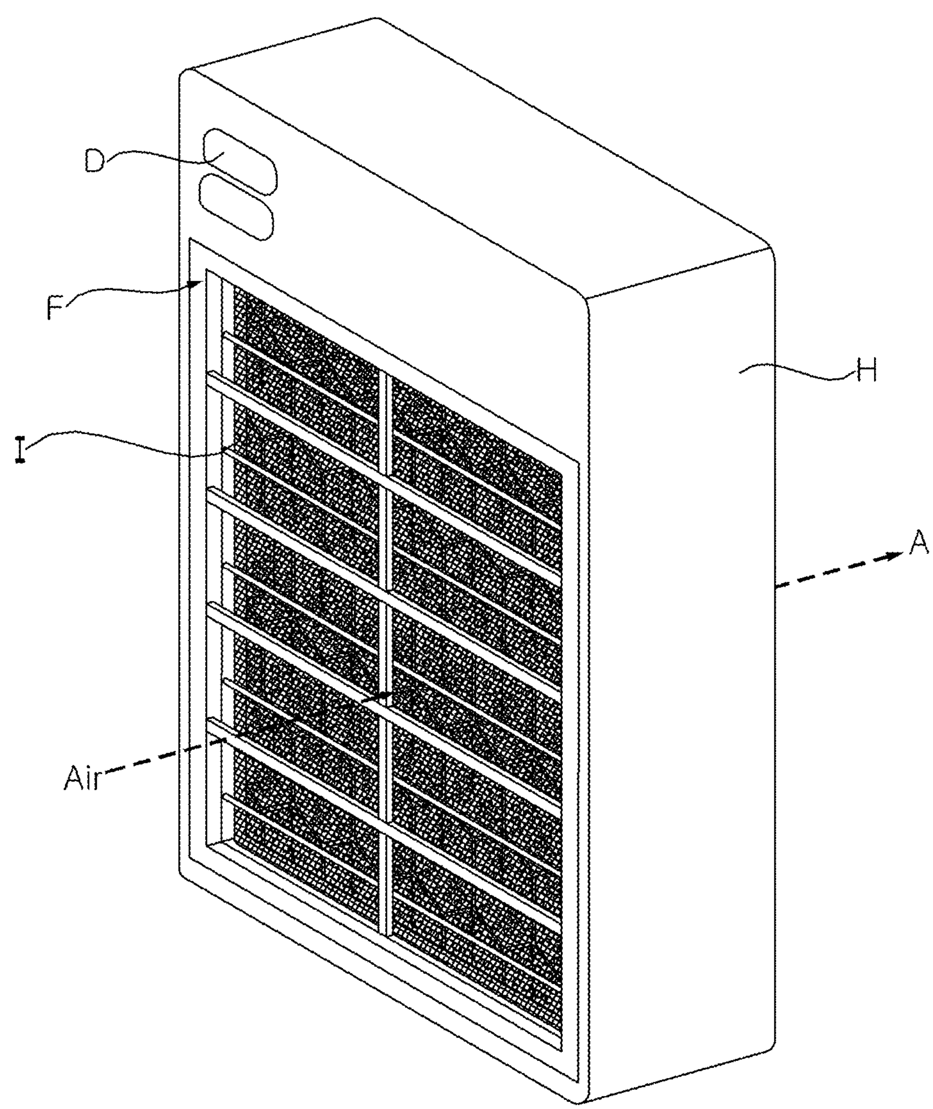
FIG. 1 is a perspective view of an air purifier including an electrostatic dust filter according to an embodiment of the present disclosure.

Hereinafter, embodiments of the present disclosure will be described in detail with reference to the accompanying drawings. The same or similar components will be denoted by the same reference numerals independent of the drawing numerals, and an overlapping description for the same or similar components will be omitted. In addition, terms "module" and "unit" for components used in the following description are used only to easily make the disclosure. Therefore, these terms do not have meanings or roles that distinguish from each other in themselves. Further, it should be understood that the accompanying drawings are provided only in order to allow exemplary embodiments of the present disclosure to be easily understood, and the spirit of the present disclosure is not limited by the accompanying drawings, but includes all the modifications, equivalents, and substitutions included in the spirit and the scope of the present disclosure.

Terms including ordinal numbers such as 'first', 'second', and the like, may be used to describe various components. However, these components are not limited by these terms. The terms are used only to distinguish one component from another component.

It is to be understood that when one component is referred to as being "connected to" or "coupled to" another component, one component may be connected directly to or coupled directly to another component or be connected to or coupled to another component with the other component interposed therebetween.

Singular forms are intended to include plural forms unless the context clearly indicates otherwise.

An air purifying device described herein includes all devices having an air cleaning function, such as an air cleaner and an air conditioner.

A chemical absorbent described herein refers to an absorbent that removes various harmful substances including carbon dioxide and five major harmful gases through a chemical reaction. The harmful substance described below may include at least one of carbon dioxide, and ammonia, acetaldehyde, acetic acid, toluene, and formaldehyde which are five major harmful gases.

Promoting the chemical reaction described herein means activating the chemical reaction or increasing the reaction rate of the chemical reaction.

Hereinafter, referring to FIG. 1, an air purifying device 1 according to an embodiment of the present disclosure may have a housing H in which an inlet I into which air is sucked and an outlet (not illustrated) through which the air is discharged are formed. The air purifying device 1 may include an electrostatic dust filter F disposed inside the housing H, a blowing fan (not illustrated) that sucks air, passes the air through the electrostatic dust filter F, and then discharges the air to the outside, and a motor (not illustrated) rotating the blowing fan. An interface unit D that displays concentrations of harmful substances in the air to a user may be disposed on a part of the housing H.

In one embodiment configured as described above, when the blowing fan (not illustrated) rotates, air is introduced into the housing H through the inlet I and passes through the electrostatic dust filter F. Thereafter, dust and harmful substances contained in the air are removed, and the air is discharged to the outside through an outlet (not illustrated).

Figure 2:
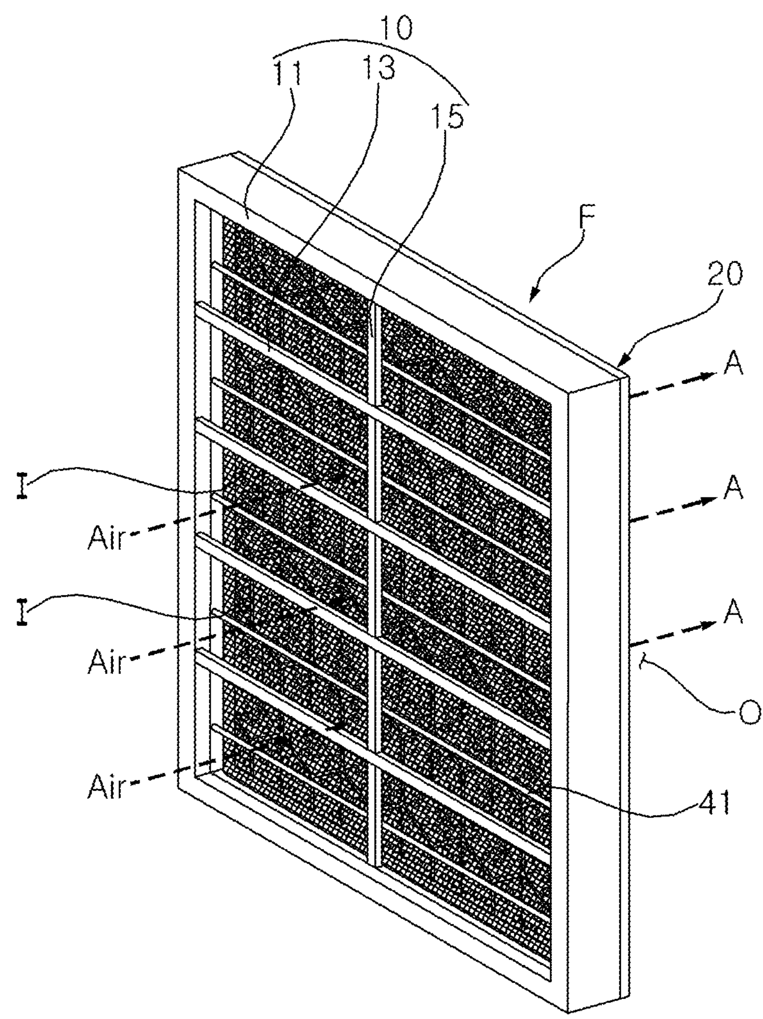
FIG. 2 is a perspective view of an electrostatic dust filter illustrated in FIG. 1.
Figure 3:
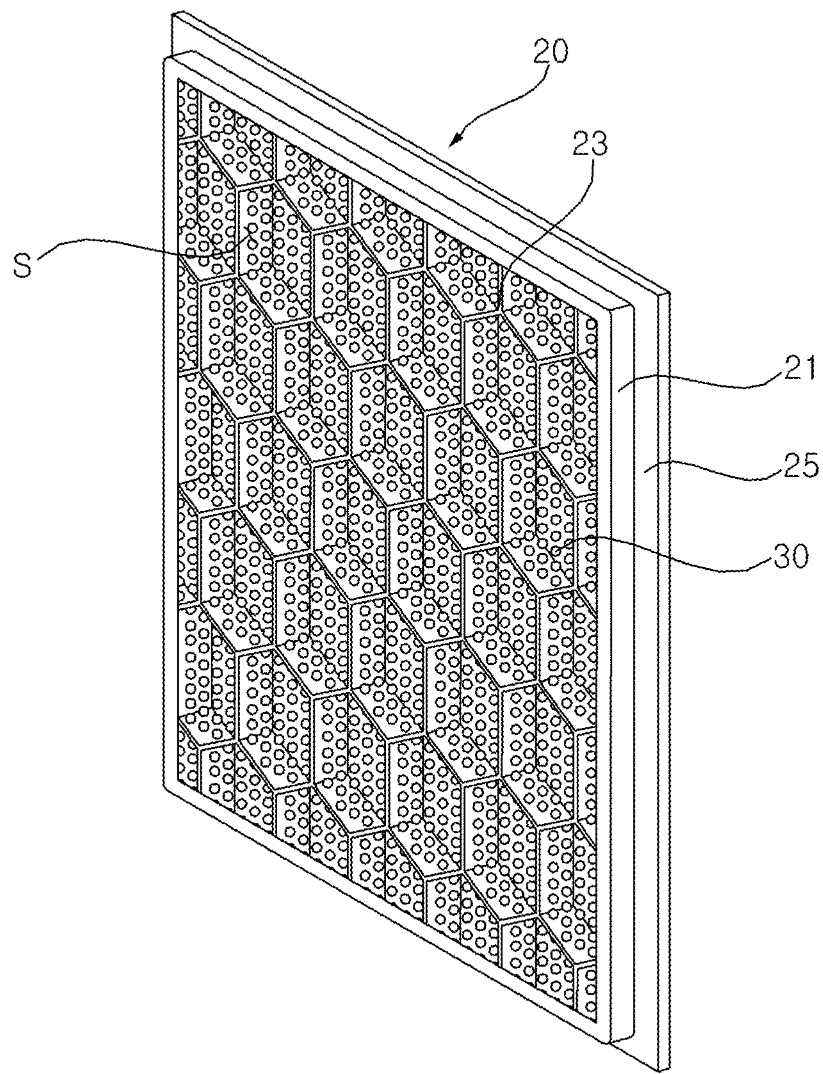
FIG. 3 is a perspective view illustrating a frame that is an internal configuration of the electrostatic dust filter of FIG. 2 and a chemical absorbent.
Figure 4:
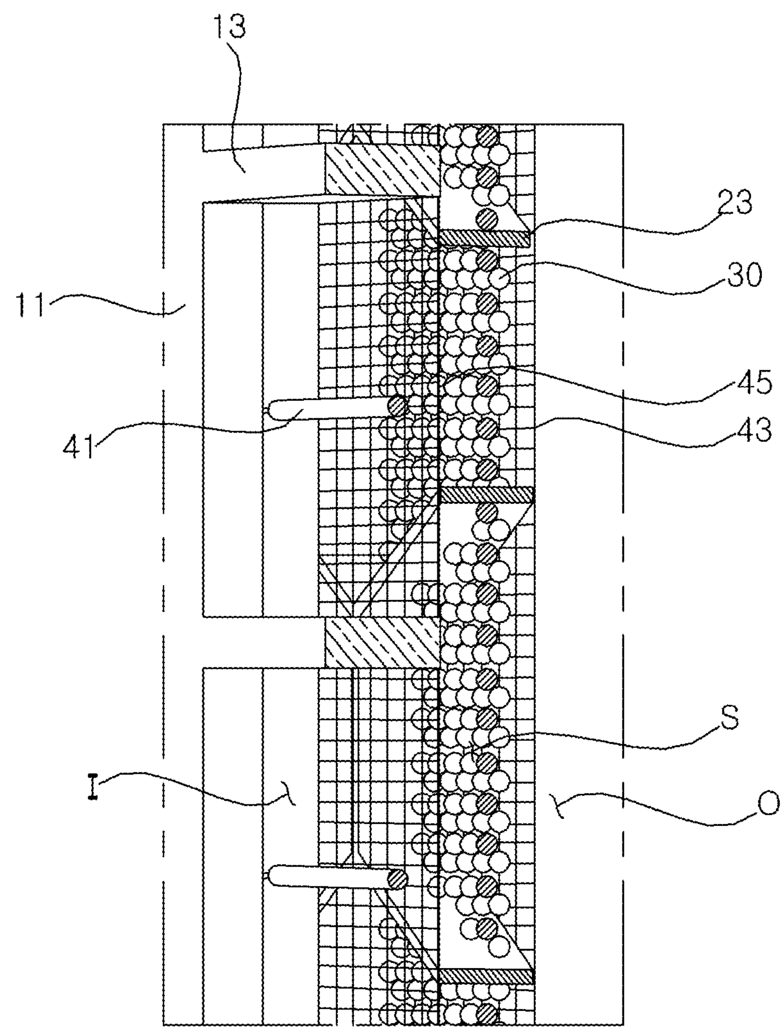
FIG. 4 is a cut-away perspective view illustrating the internal configuration of the electrostatic dust filter of FIG. 2.

Hereinafter, referring to FIGS. 2 to 4, the electrostatic dust filter F according to an embodiment of the present disclosure may include a frame 20 that is opened back and forth and forms a space S through which air passes. In addition, the electrostatic dust filter F may include a filter casing 10 that is disposed at the front of the frame and is opened back and forth to form an inlet I communicating with the space S. The rear of the space S may be provided with the space S. A chemical absorbent 30 that absorbs the harmful substances in the air may be accommodated in the space S.

The electrostatic dust filter F may include a voltage electrode 41 and a ground electrode 43 spaced apart from each other so that an electric field is generated in the space S. The voltage electrode 41 may be disposed at the front of the frame 20, and the ground electrode 43 may be disposed at the rear of the frame 20.

A high voltage is applied to the voltage electrode 41, and the ground electrode 43 may disposed to opposite to the voltage electrode to generate a discharge between the voltage electrode and the ground electrode to generate plasma. When the plasma is formed in the space S in which the chemical absorbent 30 is accommodated, the plasma may promote a chemical reaction in which harmful substances are absorbed by the chemical absorbent 30. A detailed description thereof will be provided below.

The voltage electrode 41 may have various arrangements and shapes. The voltage electrode 41 may be disposed or shaped so as not to block the flow of air while generating plasma in the space S provided inside the frame 20, and is not limited to any specific arrangement or shape.

For example, the voltage electrode 41 may be a wire-shaped electrode extending to one side. The plurality of the voltage electrodes 41 may be arranged parallel to each other. In this case, air passing through the space S formed in the frame 20 may pass through the voltage electrode 41. The air may pass through the space S after passing through a gap between the plurality of voltage electrodes 41.

The ground electrode 43 may cover the rear of the frame 20. In this case, the ground electrode 43 may face the space S formed by the frame 20. In addition, the ground electrode 43 may have a plurality of pores through which air passes. That is, the plurality of pores may communicate with the space S. Preferably, the ground electrode 43 is a conductive member and may have a mesh shape.

Meanwhile, the mesh member 45 may be disposed at the front of the frame 20. The mesh member 45 may cover the front of the frame 20. In this case, the mesh member 45 may be positioned between the voltage electrode 41 and the ground electrode 43. The mesh member 45 may be formed with a plurality of pores through which the air passes. That is, the plurality of pores may communicate with the space S. The mesh member 45 may be formed of a non-conductive member.

Accordingly, the ground electrode 43 and the mesh member 45 cover the front and rear of the frame 20, and may face the space S partitioned inside the frame 20. That is, the space S may be defined as a space surrounded by the frame 20, the ground electrode 43, and the mesh member 45.

It is preferable that the ground electrode and the mesh member have a mesh shape in which a plurality of pores are formed, and the plurality of pores are formed smaller than the size of the chemical absorbent. In this case, through the plurality of voids formed in the ground electrode 43 and the mesh member 45, the user can recognize how much of the chemical absorbent 30 accommodated in the space S is used, so it is possible to predict when the chemical absorbent 30 needs to be replaced.

Meanwhile, the chemical absorbent 30 means a harmful substance absorbent that traps or absorbs and removes the harmful substances through a chemical reaction. The chemical absorbent 30 is divided into a wet method using a liquid, a dry method using a solid, and a separation membrane method using a film type membrane depending on what type of absorbent is used to capture or absorb harmful substances.

The chemical absorbent 30 is in contact with air passing through a space of a hollow body, and absorbs and removes harmful substances contained in the air through the chemical reaction.

For example, as the chemical absorbent 30, soda lime may be used. It is known that the carbon dioxide absorption capacity of the soda lime is about 100 g, 26 L of soda lime, but actually 10 to 20 L because of the channeling effect. The soda lime may be composed of 75% $Ca(OH)_2$, 20% of $H_2O$, 3% of NaOH, 1% of KOH, and a small amount of silica. Of course, depending on the manufacturing method, the composition ratio and composition of the soda lime may vary without being limited to the above.

The soda lime absorbs and removes carbon dioxide through the following reaction formula with carbon dioxide.

(1) First, the carbon dioxide in exhaled air reacts with water to become carbonic acid [$CO_2+H_2O\rightarrow H_2CO_3$], and this carbonic acid reacts with hydroxide or potassium hydroxide, which are components of soda lime, to generate carbonate, water, and heat [$H_2CO_3+2\ NaOH(KOH)\rightarrow Na_2CO_3(K_2CO_3)+2H_2O$].

(2) Second, carbon dioxide reacts with calcium hydroxide to produce calcium carbonate and water [$CO_2+Ca(OH)_2\rightarrow CaCO_3+H_2O$].

In addition, ammonia ($NH_3$), acetic acid ($CH_3COOH$), and acetaldehyde ($CH_3CHO$) may be removed through the following reaction with the hydroxide (OH).

$$2NH_3+6OH\rightarrow N_3+6H_2O$$

$$CH_3COOH+4OH+O_2\rightarrow 2CO_2+4H_2O$$

$$CH_3CHO+6OH+O_2\rightarrow 2CO_2+5H_2O$$

When an electric field is applied to generate plasma, the ionization of harmful substances and components of soda lime in the air is promoted, thereby increasing the chemical reaction rate.

The harmful substances in the air may be removed through various chemical reaction formulas as well as the chemical reaction according to the above reaction formula. Hereinafter, descriptions related to the chemical reaction formula will be omitted, but the harmful substance may be removed by the chemical absorbent 30 through various known chemical reactions as well as the above-described harmful substance. In addition, as the chemical absorbent 30 that may absorb and remove harmful substances through the chemical reaction, various types of chemical absorbents may be used, and is not limited to the soda lime.

Meanwhile, the frame 20 may include an outer frame 21 forming a border of the frame 20 and an inner frame 23 partitioning a plurality of spaces S provided inside the outer frame 21. The inner frame 23 may be integrally formed by extending inside the outer frame 21.

The inner frame 23 may partition the space S in various shapes. For example, as illustrated, the inner frame 23 has a honeycomb structure that forms a plurality of hexagonal pillar shapes, and the space S may be partitioned into a plurality. However, the shape of the inner frame 23 is not limited thereto.

Accordingly, the chemical absorbent 30 is subdivided by a predetermined amount and accommodated in a plurality of spaces S formed by the inner frame 23, so the chemical absorbent 30 may be prevented from being drawn to one side due to the influence of gravity or the change in the size of the chemical absorbent 30 according to a period of use and may be uniformly arranged inside the frame 20.

Meanwhile, the frame 20 may further include a rib 25 protruding outward along the circumference of the outer frame 21 at the rear of the outer frame 21. The rib 25 may come into contact with the rear of the filter casing 10 to be described later. The rib 25 may be provided with a screw hole (not illustrated) or other fastening members into which a screw for fastening the filter casing 10 and the frame 20 is inserted. This is an example, and a coupling structure of the frame 20 and the filter casing 10 is not limited thereto.

The filter casing 10 may form an inlet I and an outlet O communicating with the space S. The filter casing 10 includes a casing outer frame 11 that forms a border of the filter casing 10 and casing inner frames 13 and 15 that partition the inlet I provided inside the casing outer frame 11 into a plurality of pieces.

The filter casing 10 may be recessed in a shape in which the rear corresponds to the outer frame 21. Accordingly, the outer frame 21 may be inserted into the rear of the filter casing 10. In addition, the voltage electrode 41 may be disposed in the inlet I formed in the filter casing 10, and may be fixed to the filter casing 10. For example, the voltage electrode 41 may be fixed to the casing outer frame 11 forming the border of the filter casing 10.

When the chemical absorbent 30 is replaced after the end of life of chemical absorbent 30, the electrostatic dust filter F itself may be replaced. However, by manufacturing the entire frame 20, the ground electrode 43, the mesh member 45, and the chemical absorbent 30 as one assembly, and combining the assembly with the filter casing 10 to which the voltage electrode 41 is fixed, the chemical absorbent 30 may be easily replaced and the replacement cost may be reduced.

The voltage electrodes 41 may be formed of a plurality of wire electrodes elongated to one side, and may be disposed parallel to and spaced apart from each other in the inlet I. In addition, the voltage electrode 41 may be disposed parallel to the ground electrode 43 to prevent plasma from being drawn to one side.

Figure 5A:
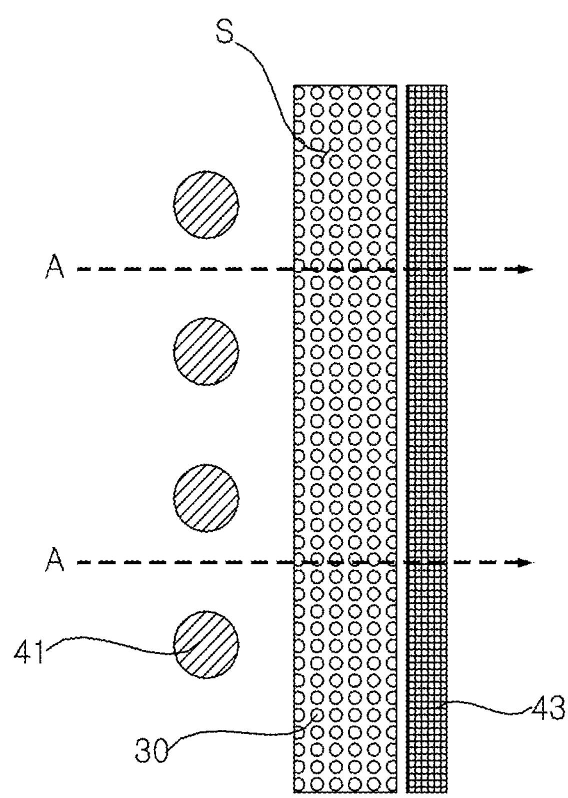
FIGS. 5A and 5B are schematic diagrams of a main configuration of the electrostatic dust filter according to the embodiment of the present disclosure. Specifically.

Hereinafter, it will be described with reference to FIGS. 4 and 5. FIGS. 4 and 5A, the chemical absorbent 30 may be disposed between the voltage electrode 41 and the ground electrode 43, and an electric field and plasma may be formed in the space S where the chemical absorbent 30 is disposed. Accordingly, dust in the air passing through the filter may be electrostatically polarized and collected on the electrode. In addition, the chemical reaction between the harmful substance in the air and the chemical absorbent 30 is promoted, so the ability to absorb the harmful substances may increase.

Figure 5B:
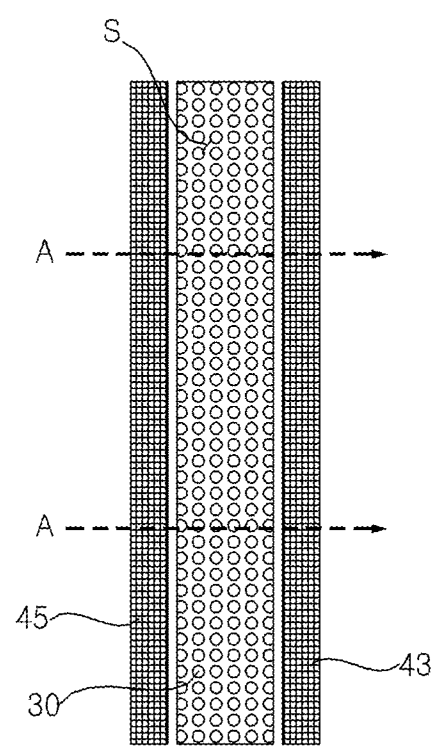

Meanwhile, referring to FIG. 5B, in the electrostatic dust filter according to another embodiment of the present disclosure, the mesh member 45 is formed of a conductive member, and a high voltage is applied to the mesh member 45 to perform the function of the voltage electrode. In this case, discharge may occur between the mesh member 45 and the ground electrode 43. In this case, the above-described voltage electrode 41 may not be separately provided. In this case, the mesh member 45 may be referred to as the voltage electrode.

Accordingly, the mesh member 45 and the ground electrode 43 may cover the front and rear of the frame 20, respectively, to accommodate the chemical absorbent 20 in the space S, and at the same time, form an electric field to collect dust in the air and promote the chemical reaction of the chemical absorbent 20. In addition, since the separate voltage electrode 41 may be omitted, the structure may also be further simplified.

In addition, it is possible to induce a kind of multi-channel corona discharge between the mesh-shaped electrodes, thereby forming a stable plasma having a large discharge volume. In a general corona electrode structure, filaments of high electron density are continuously generated in one electrode, but in the case of the structure of the present disclosure, discharge occurs one by one in each single-channel corona discharge electrode, and discharge does not occur in multiple channels at the same time, so a discharge area may be increased and the amount of consumed electrical energy may be reduced to a minimum.

Figure 6:
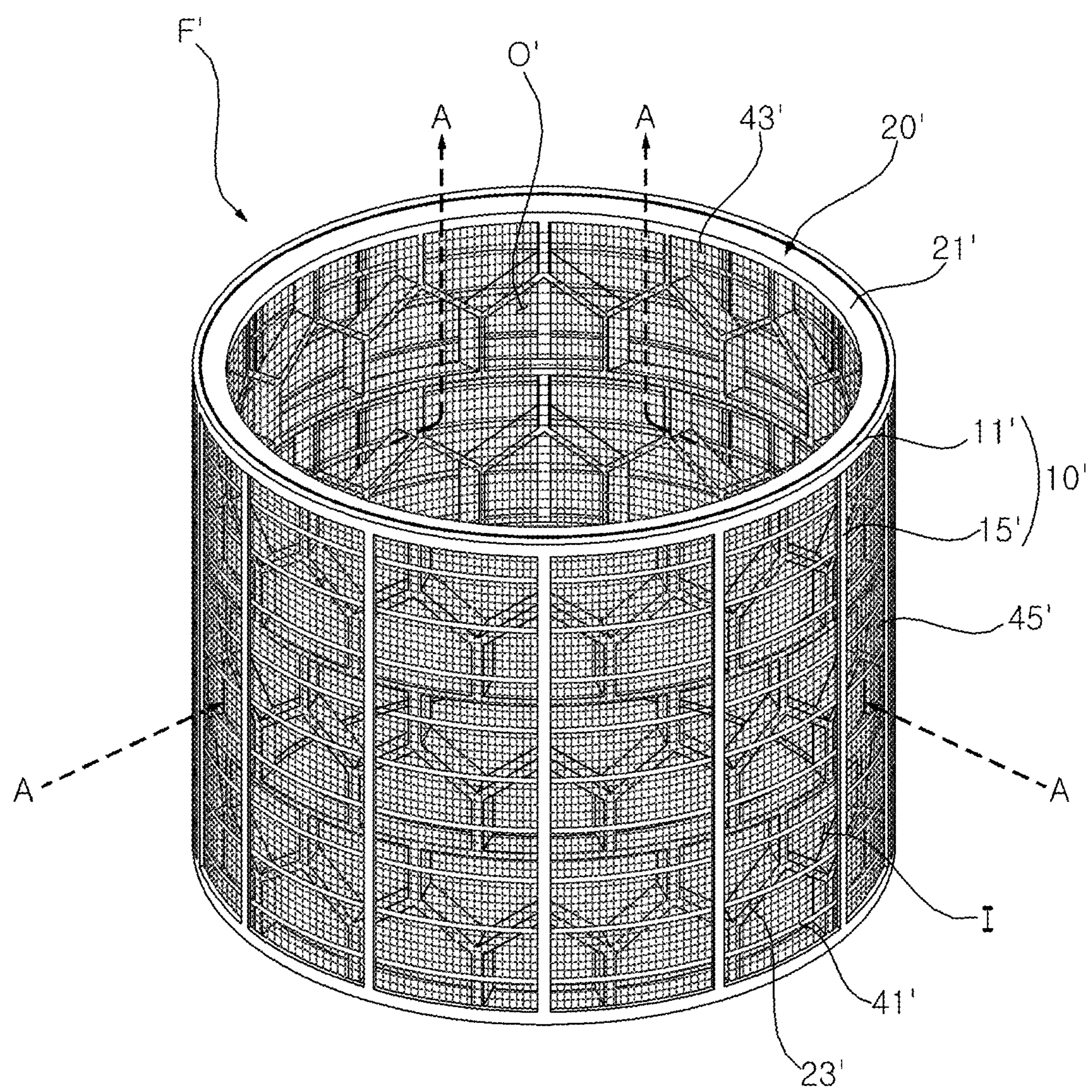
FIG. 6 is a perspective view of an electrostatic dust filter according to another embodiment of the present disclosure.
Figure 7:
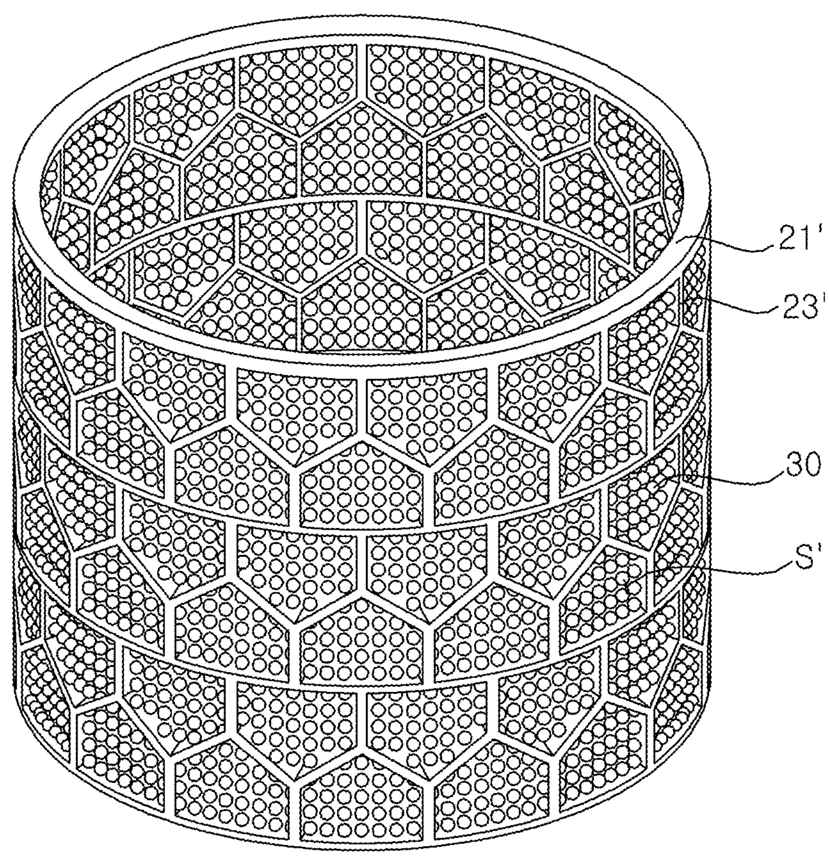
FIG. 7 is a perspective view illustrating a frame that is an internal configuration of the electrostatic dust filter of FIG. 6 and a chemical absorbent.
Figure 8:
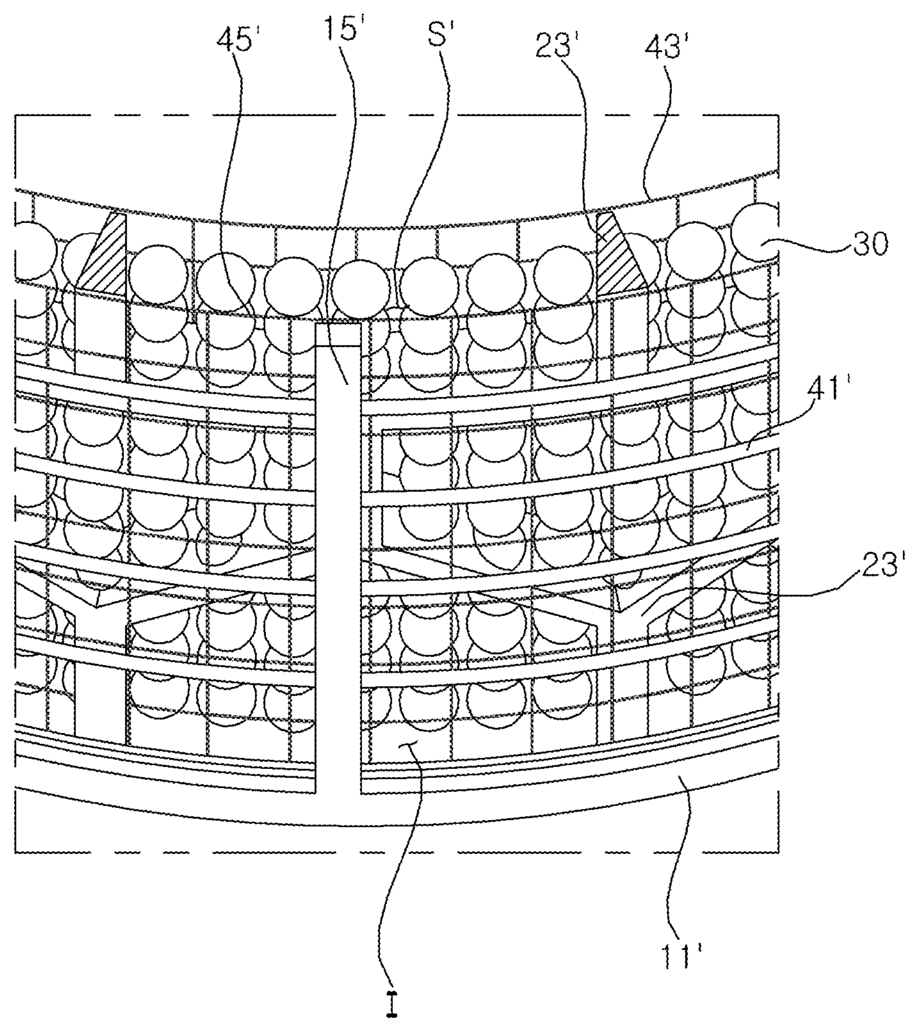
FIG. 8 is a cut-away perspective view illustrating the internal configuration of the electrostatic dust filter of FIG. 6.

Hereinafter, referring to FIGS. 6 to 8, since an electrostatic dust filter F' according to another embodiment of the present disclosure has a structure similar to that of the electrostatic dust filter F according to the embodiment of the present disclosure described above, a description of the same structure will be omitted, and the difference therebetween will be mainly described.

A frame 20' of the electrostatic dust filter F' may be formed in a cylindrical shape. In addition, a plurality of spaces S' partitioned inside an outer frame 21' by an inner frame 23' may be arranged in a circumferential direction. Accordingly, air may pass through the electrostatic dust filter F' in a 360° • direction.

On the other hand, the voltage electrode 41' has a wire shape or a ring shape elongated in the circumferential direction along the circumference of the frame 20', and a plurality of voltage electrodes 41' may be arranged vertically and parallel to each other. The ground electrode 43' may cover an inner circumferential surface of the frame 20' formed in the cylindrical shape, and the mesh member 45' may cover an outer circumferential surface of the frame 20' and partition a plurality of spaces S' together with the frame 20'. In this case, an electric field may be formed in a circumferential direction between the voltage electrode 41' and the ground electrode 43'.

In this case as well, as the above embodiment and another embodiment, the mesh member 45' may be formed of a conductive member, and a high voltage may be applied to the mesh member 45' to perform a function of the voltage electrode. In this case, discharge may occur between the mesh member 45' and the ground electrode 43'. In this case, the above-described voltage electrode 41' may not be separately provided. In this case, the mesh member 45' may be referred to as the voltage electrode.

Meanwhile, the filter casing 10' may communicate with the space and form a plurality of inlets I' arranged in the circumferential direction. In this case, a discharge port O' may mean an opening positioned at upper or lower portions of the cylindrical frame 20'.

The filter casing 10' may include a case outer frame 11' that extends in the circumferential direction along the outer circumferential surface of the frame, and is disposed vertically to form a border, and a casing inner frame 15' that partitions the inlet I' provided inside of the casing outer frame 11' into a plurality pieces. The casing inner frame 15' may extend in an axial direction between the plurality of inlets I', and a plurality of casing inner frames 15' may be arranged in a circumferential direction. In this case, the voltage electrode 41' may be fixed to the plurality of casing inner frames 15'.

Figure 9A:
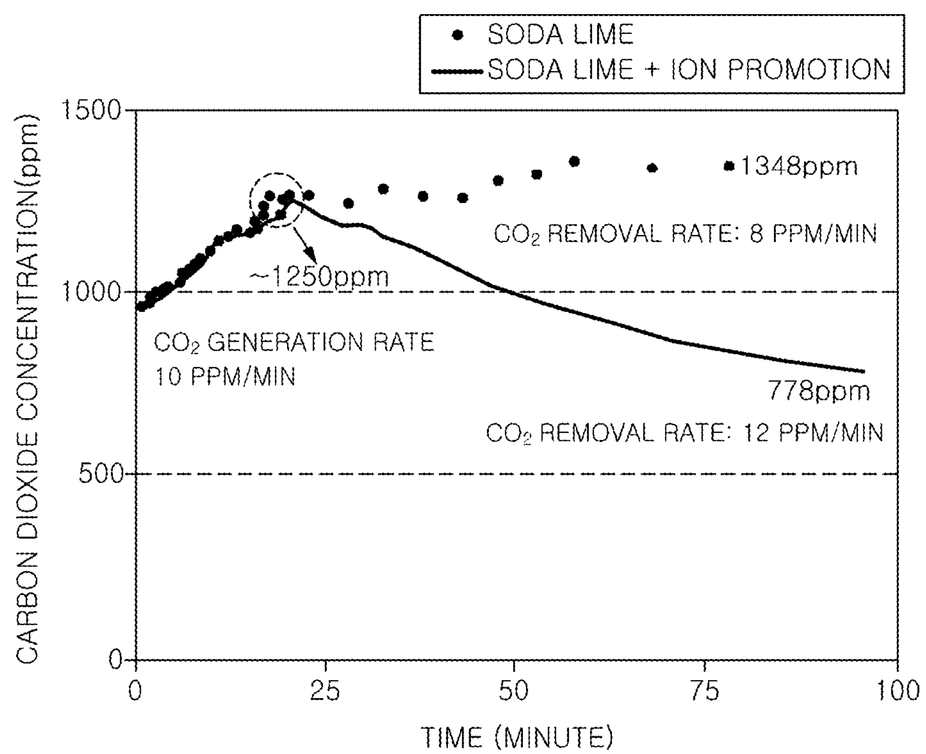
FIG. 9A and FIG. 9B is experimental result data on carbon dioxide removal performance of the electrostatic dust filter according to the embodiment of the present disclosure.
Figure 9B:
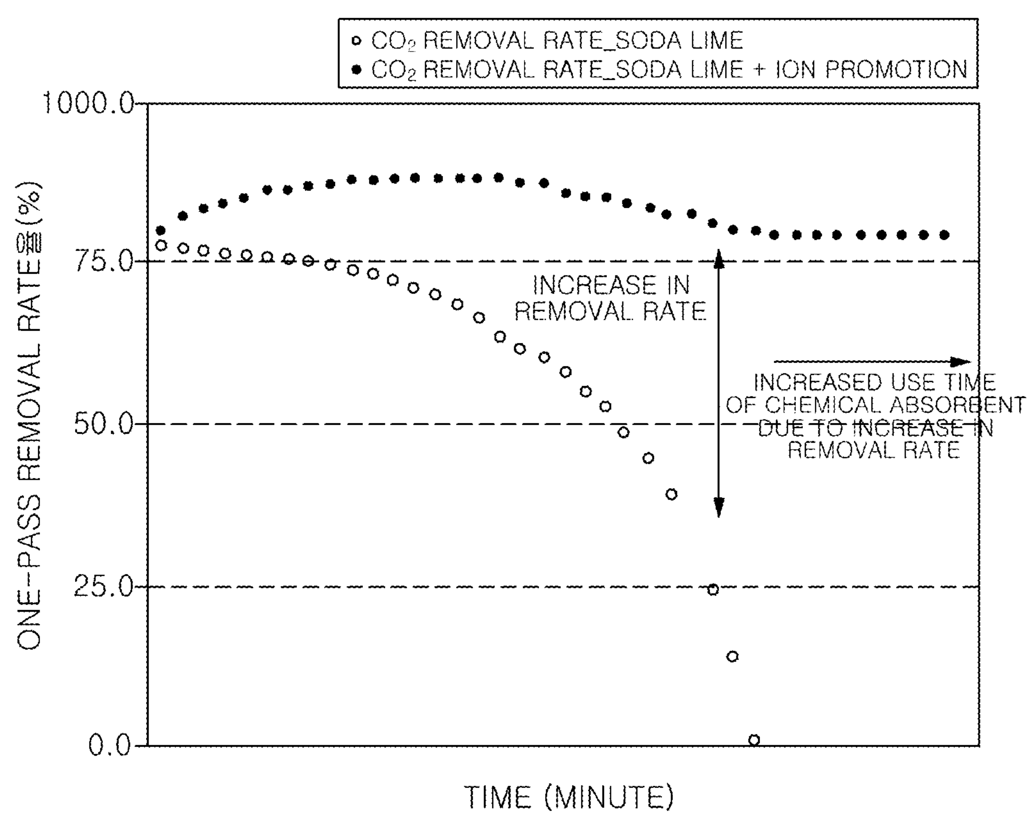

FIG. 9A and FIG. 9B is experimental result data on carbon dioxide removal performance of an electrostatic dust filter F according to the embodiment of the present disclosure.

Hereinafter, referring to FIG. 9A and FIG. 9B, the experiment was conducted by comparing the case of removing carbon dioxide using only the chemical absorbent 30 and the case of removing carbon dioxide using the principle of the electrostatic dust filter F according to an embodiment of the present disclosure. The experiment was conducted with two occupants in an indoor space of about 4 pyeong (with one pyeong being equal to approximately 3.3 square meters) by using soda lime as the chemical absorbent 30, applying a voltage of 3 kV to the voltage electrode 41. In this case, a generation rate of the carbon dioxide was confirmed to be about 10 ppm/min.

Referring to FIG. 9A, carbon dioxide removal was started when the amount of carbon dioxide reached about 1250 ppm. When carbon dioxide was absorbed and removed using only the soda lime, a removal rate of the carbon dioxide was found to be about 8 ppm/min on average, and the removal rate of the carbon dioxide was slower than that of the carbon dioxide under the experimental conditions, and thus the carbon dioxide content showed a tendency to increase little by little. However, when the reaction of the soda lime and the carbon dioxide is promoted using the principle of the electrostatic dust filter F according to the embodiment of the present disclosure, the removal rate of the carbon dioxide was confirmed to be about 12 ppm/min on average, which showed a significant difference in the removal rate of the carbon dioxide than when only the chemical absorbent 30 was used.

Referring to FIG. 9B, when carbon dioxide is absorbed and removed using only the soda lime, the removal rate of the carbon dioxide of about 75% was maintained initially, but it was confirmed that the absorption performance of soda lime for carbon dioxide decreases as time passed. However, when the reaction of the soda lime and the carbon dioxide is promoted using the principle of the electrostatic dust filter F according to the embodiment of the present disclosure, the carbon dioxide removal rate is continuously maintained at about 75% or more even as time passes, so it has been confirmed that the service life of the chemical absorbent is prolonged.

In addition, although the preferred embodiments of the present disclosure have been illustrated, the present disclosure is not limited to the specific embodiments described above, and can be variously modified by those skilled in the art to which the present disclosure pertains without departing from the gist of the present disclosure claimed in the claims, and these modifications should not be understood individually from the technical ideas or prospects of the present disclosure.

What is claimed is:

1. An electrostatic dust filter, comprising:

a frame that is opened back and forth and forms a space through which air passes;

a chemical absorbent that is accommodated in the space and absorbs a harmful substance in the air;

a mesh member that covers a front of the frame and has a plurality of pores through which the air passes;

a ground electrode that covers a rear of the frame, has a plurality of pores through which the air passes, and is grounded; and a voltage electrode that is disposed opposite to the ground electrode with respect to the mesh member and is applied with a high voltage, wherein:

the frame is formed in a cylindrical shape, and the space is arranged in a circumferential direction, the voltage electrode has a ring shape extending in the circumferential direction along a circumference of the frame, the ground electrode covers an inner circumferential surface of the frame, and the mesh member covers an outer circumferential surface of the frame.

2. The electrostatic dust filter of claim 1, wherein the frame includes:

an outer frame that forms a border of the frame; and an inner frame that partitions the space provided inside the outer frame into a plurality of pieces.

3. The electrostatic dust filter of claim 2, further comprising:

a filter casing that forms an inlet communicating with the space, and is recessed in a shape corresponding to the outer frame so that the outer frame is inserted, into the filter casing, wherein the voltage electrode is disposed at the inlet and fixed to the filter casing.

4. The electrostatic dust filter of claim 3, wherein the voltage electrode is elongated and provided in plurality, and the plurality of voltage electrodes are arranged parallel to each other and disposed parallel to the ground electrode.

5. The electrostatic dust filter of claim 2, wherein the voltage electrode is provided in plurality, and the plurality of voltage electrodes are arranged parallel to each other.

6. The electrostatic dust filter of claim 1, further comprising:

a filter casing that is arranged in a circumferential direction to form a plurality of inlets communicating with the space, wherein the filter casing is fixed to the voltage electrode.

7. The electrostatic dust filter of claim 6, wherein the filter casing includes a plurality of casing inner frames extending in an axial direction between the plurality of inlets and arranged in the circumferential direction, and the voltage electrode is fixed to the plurality of casing inner frames.

8. The electrostatic dust filter of claim 1, wherein the ground electrode and the mesh member have a mesh shape in which the plurality of pores of the ground electrode and the mesh member are formed smaller than a size of the chemical absorbent.

* * * * *